(12) United States Patent
Ferguson et al.

(10) Patent No.: US 8,209,699 B2
(45) Date of Patent: *Jun. 26, 2012

(54) SYSTEM AND METHOD FOR SUBUNIT OPERATIONS IN A DATABASE

(75) Inventors: Gregory Paul Ferguson, Oakville (CA); Jeffrey Maurice Heisz, Toronto (CA); Richard Ta-Min, Toronto (CA); Yi Wang, Scarborough (CA); Branko Daljevic, Toronto (CA)

(73) Assignee: Teradata US, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,388

(22) Filed: Jul. 9, 2010

(65) Prior Publication Data

US 2011/0029498 A1 Feb. 3, 2011

Related U.S. Application Data

(60) Provisional application No. 61/213,750, filed on Jul. 10, 2009.

(51) Int. Cl.
*G06F 9/46* (2006.01)
*G06F 7/00* (2006.01)
(52) U.S. Cl. ........................................ 718/104; 707/704
(58) Field of Classification Search .................. 718/104; 707/704
See application file for complete search history.

(56) References Cited

U.S. PATENT DOCUMENTS

| | | | |
|---|---|---|---|
| 6,950,848 B1 * | 9/2005 | Yousefi'zadeh | 709/203 |
| 7,158,976 B1 * | 1/2007 | Longinov et al. | 1/1 |
| 2004/0220933 A1 * | 11/2004 | Walker | 707/8 |
| 2006/0101081 A1 * | 5/2006 | Lin et al. | 707/200 |
| 2006/0129528 A1 * | 6/2006 | Miyamoto et al. | 707/3 |
| 2007/0156765 A1 * | 7/2007 | Hubbard et al. | 707/200 |
| 2007/0203910 A1 * | 8/2007 | Ferguson et al. | 707/8 |
| 2010/0145916 A1 * | 6/2010 | Glebe et al. | 707/687 |

OTHER PUBLICATIONS

Amza et al., Conflict-Aware Scheduling for Dynamic Content Applications, 5th USENIX Symposium on Internet Technologies and Systems, Mar. 2003, 14 pages.*

* cited by examiner

*Primary Examiner* — Meng An
*Assistant Examiner* — Brian Chew
(74) *Attorney, Agent, or Firm* — James Stover

(57) ABSTRACT

A method for processing a transaction request at a database load balancer is disclosed. The method comprises receiving the transaction request, where the transaction request is comprised of one or more operations to be performed upon a database; analyzing the transaction request to determine the one or more operations; analyzing the transaction to determine one or more database units associated with the operations; analyzing the transaction requests and the one or more database units to determine one or more database subunits associated with the database units that the transaction request will perform one or more operations upon; associating one or more database locks with each of the one or more operations; analyzing one or more of the database locks to determine one or more sequence numbers associated with each of the one or more operations; and transmitting one or more unique identifiers for each of the database subunits, the one or more operations with the associated database locks and the sequence numbers to one or more database servers accessible to the database load balancer. Systems, apparatus and computer programming associated with or implementing the method are also disclosed.

16 Claims, 10 Drawing Sheets

CUSTOMERS

| CUSTOMER ID | NAME | ADDRESS | OTHER INFORMATION |
|---|---|---|---|
| 889 | | | |
| 982 | | | |
| 646 | | | |
| 312 | | | |
| 786 | | | |
| 725 | | | |

FIG. 3

| OPERATION FIELD 72 | SEQUENCE NUMBER FIELD 74 | LOCKS REQUESTED FIELD 76 | RESPONSE FIELD 78 | SUBUNIT IDENTIFIER 79 |
|---|---|---|---|---|
| • • •<br>• • •<br>• • • | • • •<br>• • •<br>• • • | • • •<br>• • •<br>• • • | • • •<br>• • •<br>• • • | • • •<br>• • •<br>• • • |

| DATABASE SERVER FIELD 82 | LOAD FIELD 84 |
|---|---|
| • • •<br>• • •<br>• • • | • • •<br>• • •<br>• • • |

| CONNECTION FIELD 90 | OPERATIONS FIELD 92 | STATUS FIELD 93 |
|---|---|---|
| • • • | • • • | • • • |
| • • • | • • • | • • • |
| • • • | • • • | • • • | ic # SYSTEM AND METHOD FOR SUBUNIT OPERATIONS IN A DATABASE

This is a continuation-in-part of application U.S. patent application Ser. No. 11/674,533; entitled "METHOD AND SYSTEM FOR LOAD BALANCING A DISTRIBUTED DATABASE," by Gregory Ferguson, Jeffrey Heisz, David Tung, Muhammad Mansoor Jamal, and Ariff Kassam; filed on Feb. 13, 2007.

This application claims the benefit of U.S. provisional Application 61/213,750, entitled "System and Method for Subunit Operations in a Database," and filed Jul. 10, 2009, the contents of which are incorporated herein by reference.

FIELD

The embodiments described herein relate generally to the field of database application and more specifically to distributed databases

BACKGROUND

Many hardware/software applications rely on a database for the storage of data records. A database may generally be understood as a collection of records stored upon a hardware device in a systematic way.

As the need to store increased amounts of data grows, so does the need to efficiently store and access the data. Databases are used to store large volumes of data, and therefore the applications that are used to write to them, and read from them, need to be implemented to make the most efficient use of the databases.

Regardless of the volume of data stored upon a database, when using multiple databases for the purposes of data storage, two elements will typically be in common, the first being a means by which data records may be stored, and the second a locking mechanism. The locking mechanism controls access to the data records stored on the database.

Where large volumes of data are being stored on a database, or a large number of requests are made for the data, a bottleneck often develops where the database is not able to serve the read and write requests fast enough. Examples of such bottlenecks are found in many applications and environments. Bottlenecks may occur for a variety of reasons, including, but not limited to, where the database is experiencing too heavy a load (too many requests are being made to the database), the task the database is being asked to perform is performed inefficiently (therefore slowing down response times), or where the database does not possess the required processing ability to respond to the request in an efficient manner.

One solution proposed to deal with database bottlenecks is to store the database upon a server with increased processing ability. There are several drawbacks to such an approach. One such drawback involves the cost of the server and associated software, as the cost often increases exponentially with the processing capability of the server. Another drawback relates to when provisions are being made for availability or disaster recovery, where an additional significant cost is encountered in acquiring and maintaining a second server of equivalent size and cost that is idle and does not contribute to the data processing ability (otherwise there is still a single point of failure in the system).

Another proposed solution to address the database bottleneck problem, is to utilize a cluster of smaller database servers which process the data records and which utilize a single, common device for the storage of the database records (i.e. only a single copy of the database records exists). This solution does provide a lower cost incremental capability for increasing the processing ability of the database (augmented by adding new servers) but still can encounter a bottleneck for the shared storage resource.

Yet another proposed solution is to use a cluster of database servers, where each server has its own private and identical set of database records (a plurality of database servers) along with a separate, centralized device that virtualizes (to external clients) the cluster of database servers into a single database instance. This external device is then responsible for ensuring that all database requests and transactions are delivered to each of the database servers in the cluster in a way that ensures the accuracy and consistency of the database records. There are several algorithms used for performing this distribution. Some algorithms used to implement this solution require the completion of all operations associated with a particular transaction before the next transaction is executed, even when it is not necessary to wait for the completion of the preceding transaction. Such algorithms therefore tend to not make efficient use of the multiple database resources that are available for use.

The performance issues associated with the use of distributed database clusters tend to be associated with the database records, and the size of the database records that are accessed.

When dealing with database records in a distributed database environment, in order to ensure accuracy across the various databases, database locks are issued in order to ensure that there is consistency of data. Therefore, read and write locks are issued when a read or write function may not be performed because a previous operation is still pending. The locks that are issued such that they lock the entire database record, may not be required where the operation that is to be performed may only modify a certain element within the record.

SUMMARY

In one embodiment of the invention, a method for processing a transaction request at a database load balancer is disclosed. The method comprises receiving the transaction request, where the transaction request is comprised of one or more operations to be performed upon a database; analyzing the transaction request to determine the one or more operations and to determine one or more database units associated with the operations; analyzing the transaction requests and the one or more database units to determine one or more database subunits associated with the database units that the transaction request will perform one or more operations upon; associating one or more database locks with each of the one or more operations; analyzing one or more of the database locks to determine one or more sequence numbers associated with each of the one or more operations; and transmitting the one or more operations with the one or more unique identifiers for each of the database subunits, the database locks and the sequence numbers to one or more database servers accessible to the database load balancer.

In another embodiment of the invention, a method of processing a transaction request at a database load balancer is disclosed. The method comprises receiving the transaction request, where the transaction is comprised of one or more operations to be performed upon a database; analyzing the transaction request to determine the one or more scripts to be executed through a scripting module; determining through the scripting module and associated scripts, the one or more operations, the one or more database units associated with the database record, the one or more database subunits associated with each database unit and the one or more locks with the one or more operations; analyzing the one or more database locks to determine one or more sequence numbers associated with each of the one or more operations; and transmitting the one or more operations with the one or more unique identifiers for each of the database subunits, the associated database locks and the sequence numbers to one or more database servers accessible to the database load balancer. In other embodiments, systems, apparatuses, and computer programming related to the above are set out.

BRIEF DESCRIPTION OF THE DRAWING FIGURES

For a better understanding of the present invention and to show more clearly how it may be carried into effect, reference will now be made, by way of example, to the accompanying drawings, which show a preferred embodiment of the present invention and in which:

FIG. 3 is a block diagram of a database record and its associated subunits.

FIG. 4 is a diagram illustrating the fields of the scheduler table;

FIG. 5 is a diagram illustrating the fields of the database load table;

DETAILED DESCRIPTION OF THE PREFERRED EMBODIMENT

Figure 1:
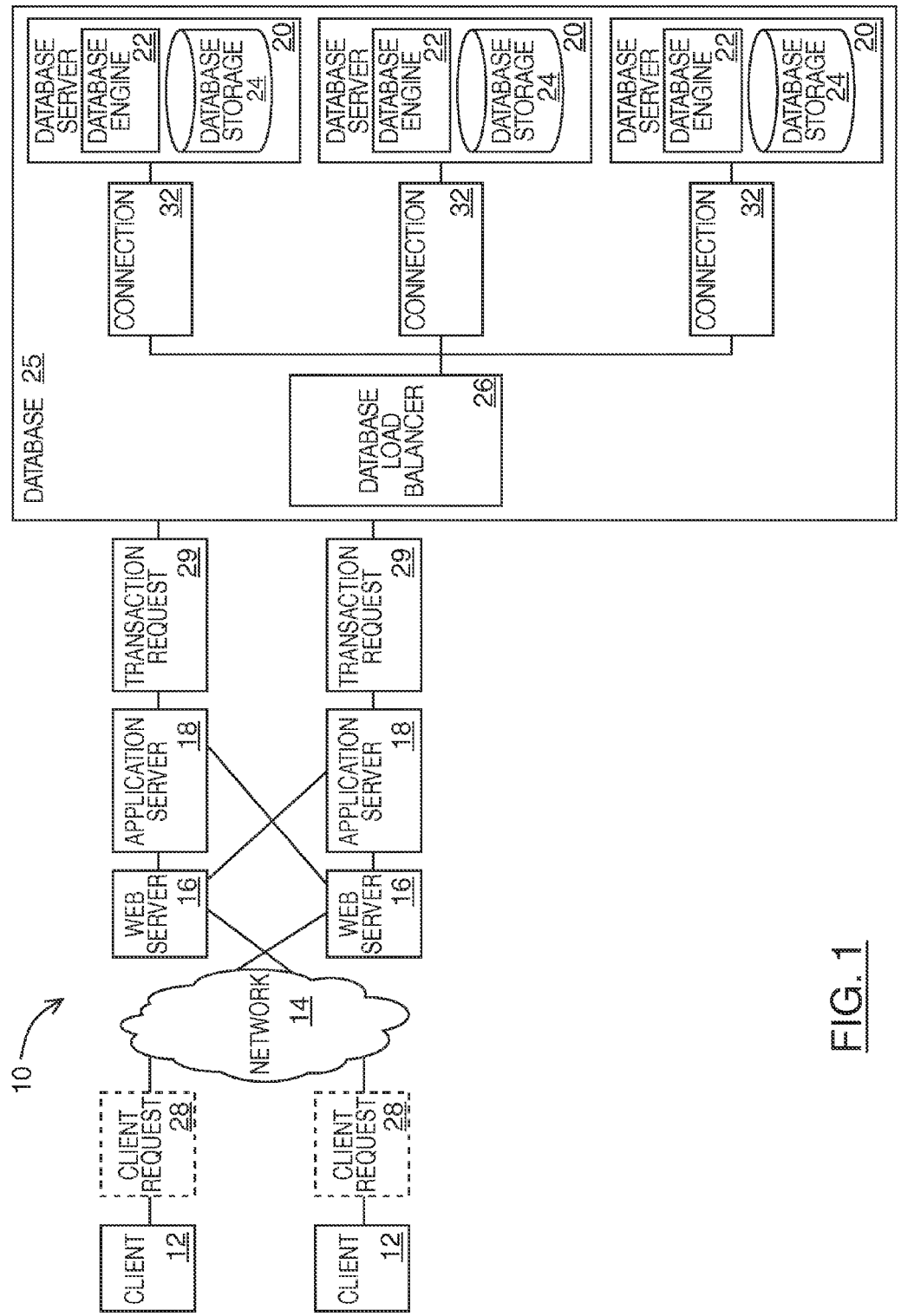
FIG. 1 is a block diagram of the components of a distributed database system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, or cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Reference is now made to FIG. 1, where the components of an exemplary embodiment of the distributed database system 10 are shown. In FIG. 1, the distributed database system 10 is illustrated with reference to a network environment. The distributed database system 10, as is illustrated in further detail below, may be used in different environments. The distributed database system 10 may be used by one software application that stores data, or in a network setting where there is client-server interaction, or any environment where data is stored.

In the system 10, one or more clients 12 may initiate a client request 28. The client request 28 is generated based on the client's request for certain functionality or data. Client requests 28 result from most operations that are performed upon the client 12, including, but not limited to, the request to access certain data, saving a file, or to view certain files or data. The client requests 28 are transmitted through a network 14. The network 14 may be any network that allows for communication between devices and for purposes of this example, is the Internet. The client 12 interacts with the servers and their respective applications and makes a request relating to a database record. The requests may include various database operations including, but not limited to, specific data read or write operations as well as operations associated with record metadata and transactional consistency (e.g. commit and rollback operations). The client request 28 may translate into one or more operations that access and or modify database records stored on the respective database servers 20. The term database records is used herein to describe any instance of data that is stored in the system 10. For purposes of description a database unit can include a database table, which can include database records. It will be appreciated that a unit can be understood as a collection of data, while a subunit in a subset of that collection of data, including the unit itself, such as for example in a table (unit) and rows of the table (subunit) relationship. The respective elements or components that make up the database unit, which in the example of a database table are database rows are referred to as database subunits. It will be clear to one skilled in the art that the respective database subunits may themselves have database subunits. The client request 28 is transmitted through the network 14, to the web server 16, which transmits the client request 28 to the application server 18. The application server 18 translates the client request 28 into one or more database-specific operations that are collectively referred to as a transaction request 29. The transaction request 29 contains database operations that are to be performed upon a database 25 that is visible to the clients 12 that need to be performed to fulfill the client request 28 to the clients 12. A transaction request 29 will result in one or more database operations, which may include, but are not limited to modifying option settings, read or select operations, write operations, commit operations, and rollback operations. The transaction request 29 represents a set of database operations that are being processed as part of a single transaction. In an exemplary embodiment, the distributed database 25 is implemented across one or more database servers 20, where as described below each database server 20 comprises a storage that stores the identical records that make up the database upon the respective database storages 24. The exemplary embodiment is shown with respect to one distributed database 25 that is implemented through all of the database servers 20. In alternative embodiments, the database servers 20 may be used to implement more than one distributed database 25, that has, multiple and different collections of data records. In embodiments, wherein more than one database 25 is implemented upon the respective database servers 20, multiple database servers 20 may be used to replicate the data records for each database 25, however not all database servers 20 are required to implement all of the database instances. While the various database servers may have stored upon them database storage for more than one database, the database storage for each database will contain identical records. The alternative embodiment allows for the potential improved use of resources, as each database system is implemented upon the database servers 20 that are appropriate considering the processing requirements that are required. A database load balancer 26 receives the transaction request 29. The database load balancer 26, in an exemplary embodiment, may be resident upon an independent server that receives the transaction requests 29. In alternative embodiments, the database load balancer 26 may be resident upon any one of the database servers 20 that it connects to, or any one of the application servers 18 that it receives transaction requests 29 from. In alternative embodiments, more than one database load balancer 26 may be present, where each database load balancer 26 has associated with it one or more database engines and storage servers. In such an arrangement, there will also be connections between the database load balancers for the coordination of the system. When more than one database load balancer is used, one load balancer may be designated as a master load balancer. As the load balancers must agree upon the sequence of execution of the operations, as described below, the master load balancer would communicate the sequencing information with the other load balancers. Each load balancer also will maintain, in an exemplary embodiment transactional logs that are described below. The database load balancer 26 is used to virtualize the plurality of database servers into one distributed database 25. The distributed database 25 contains one or more database servers 20, but appears to be one database environment to the applications/servers that are sending transaction requests 29. The database load balancer 26 maintains connections 32 to the multiple database servers 20, where each database engine 22 is used to store identical data records upon the respective database storages 24. A connection 32 is opened between each database server and the database load balancer 26. The database load balancer 26, may have any number of connections 32 established between itself and the respective database servers 20.

The database load balancer 26, upon receiving a transaction request will make use of one or more database servers 20, and the respective database storage 24 associated with the server 20. The components of the database load balancer 26 are illustrated in further detail below.

The database load balancer 26 sends all transaction requests 29, and more specifically the operations that comprise the request, along with sequencing, lock and other management operations to one or more of the database servers 20. The sequencing, lock, and other management operations are needed to properly maintain the consistency of database records contained in the plurality of database storages 24. There are various instances of management operations that will be required to maintain the data consistency of the virtualized database 25. Management operations include, but are not limited to, requests for user connection and statement allocations, implicit configuration or option settings, recovery and roll-forward information and implicit close or rollback operations where errors or system failures are encountered.

Figure 2:
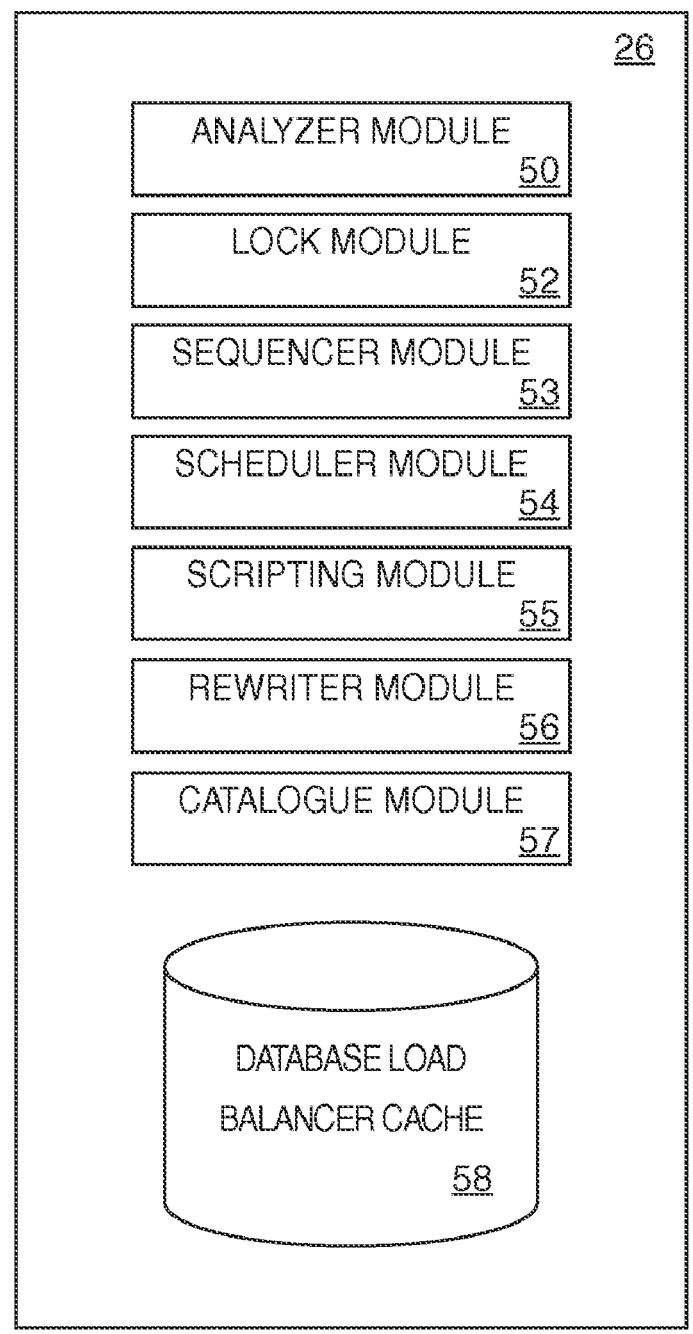
FIG. 2 is a block diagram illustrating the components of the database load balancer.

Reference is now made to FIG. 2, where the constituent components of the database load balancer 26, are shown in one exemplary embodiment. In an exemplary embodiment, the database load balancer 26 is comprised of an analyzer module 50, a lock module 52, a sequencer 53, a scheduler 54, a scripting module 55, a rewriter module 56, a catalogue module 57, and a database load balancer cache 58. The analyzer module 50 is used to analyze the transaction request 29 (FIG. 1). In one exemplary embodiment, the transaction request 29 (FIG. 1) as received by the analyzer module 50 is comprised of one or more SQL statements. The embodiment is described with respect to the processing of SQL statements, however, the system is capable of being used with database query languages other than SQL, or with databases that utilize procedural data processing rather than a query language. Other such languages include but are not limited to XQUERY which is used for XML databases and OQL or QUEL which are used for object oriented databases. Alternative embodiments may also utilize multiple analyzer modules. The analyzer module 50 parses the SQL statement or other language statements, and determines the read and write operations being requested by the transaction request 29 (FIG. 1) and determines which database records are requested to be read and which database records are requested to be modified. More specifically, the analyzer module determines the database units and/or subunits that will be operated upon where both exact and inexact predicates have been received. Exact predicates are those that identify the specific subunits that will be operated upon whereas the use of inexact predicates does not allow for prior knowledge to be obtained regarding the subunits to be operated on. In alternative embodiments, the analyzer module 50 may be an independent module that implements a parallel process that receives instructions from the database load balancer 26 and determines the requests that have been made by the transaction requests 29 (FIG. 1).

Database records may be accessed either through direct or indirect access. Direct access occurs when the SQL statement is a direct select or update operation. Examples of indirect accesses include, but are not limited to, function and stored procedure calls (e.g. a function call will read/write a specific set of records), views or other database objects that access and consolidate database records into a new dataset, and other database relationship constructions such as foreign key constraints.

The lock module 52 determines the locks that are to be placed on database unit or subunit, such as a record, based on the transaction request 29 (FIG. 1) that is received. Database locks are used to ensure consistency of data, along with synchronization of database records, and are used to control parallel access to the database records. By implementing database locks, which define the specific operations that are permitted upon a database record or set of such records, a scenario is avoided where parallel attempts are made to access and or modify a data record, which may result in inconsistent results. Therefore, database locks allow for consistency of the data that is contained within the database records of the respective database storages 24 (FIG. 1). As the database 25 (FIG. 1) uses more than one database storage 24 (FIG. 1), the database locks ensure that consistent results are obtained when writing to or reading from any of the databases storages 24 (FIG. 1). As the database records may be accessed and or modified by more than one transaction request 29 (FIG. 1), database locks ensure that concurrent access by different transaction requests is not allowed where inconsistent data would result. In an embodiment, the database unit and/or subunits that are determined as requiring locking can be referred to as an operations unit set.

The lock module 52, based on the transaction request 29 (FIG. 1), determines which database locks need to be issued. In an exemplary embodiment, there will be at least two types of database locks that are required. One type of database lock controls concurrent reading of data records, and one controls concurrent writing to data records. A read lock that is placed upon a database record ensures that as the particular database record is being read, no write operations may be performed upon the particular database record. A write lock ensures that as the database record is being written to, no other read or write operations may be performed upon the particular database record. Additional locking levels may be made available as required by the database implementation (e.g. exclusive locks) that can be at different "levels" from the read/write locks. The lock module also implements the appropriate interaction between locks for unit and subunit records. In general, a unit-level lock is comparable to the collection of all subunit level locks for the nested database records within the unit record. For example, according to the rules above, a write lock for a data subunit record ensures that an additional read or write operation cannot happen for that subunit or the parent data unit but does not block other data subunits, while a write lock for the data unit prevents other read and write operations for the data unit record and all data subunit records within it. In alternative embodiments, the lock module 52 may be implemented as a separate parallel process which is provided with the record information and provides the appropriate lock information.

The sequencer module 53 receives the results from the analyzer module 50, and proceeds to assign a sequence number to each of the transaction operations that will access a particular database record. Sequence numbers are assigned to all the database locks including both unit and subunit level locks, as the sequence number as described further allow for a proper ordering of the locks within the queues. Sequence numbers are assigned so that the transaction operations may be ordered when they proceed to attempt to operate upon the respective database storage 24 (FIG. 1), and more specifically upon the specific database units, subunits or records. As each transaction request has associated with it one or more database locks, the sequence number assigned to the transaction operations are then associated with the database locks as explained in further detail below. The database load balancer 26 may contain more than one sequencer, so long as there is a single authoritative sequence assigned for any specific database record. In alternative embodiments, the sequencer module 53 may be implemented as a separate parallel process, which receives the lock information and provides the assigned sequence numbers. The sequence module 53 may also be implemented upon a separate computing device. Where the sequencer module 53 is implemented as a centralized process, as described above, it may be associated with one database load balancer, or in alternative embodiments, one sequencer module may be associated with more than one database load balancer 26. Where a sequencer module 53 is associated with two or more database load balancers 26, the two or more database load balancers 26 can be used to provide active backups to the other database load balancers 26. Therefore, when either database load balancer becomes unavailable for any reason, the other database load balancer 26 is able to service the requirements of the clients that are making requests to the load balancers. Where the sequencer module 53 is associated with two or more database load balancers 26, the sequencer module 53 allows one or more of the load balancers to service the transaction requests that are now received by one of the load balancers 26. For example, where two database load balancers 26 are used within a system 10, where the first load balancer may be responsible for managing a first part of an organization's data, and the second database load balancer can be responsible for the second part of an organization's data, having one sequencer module 53 associated with both database load balancers allows for a complete replication of either of the database load balancers 26 where one becomes unavailable.

Figures 6, 7:
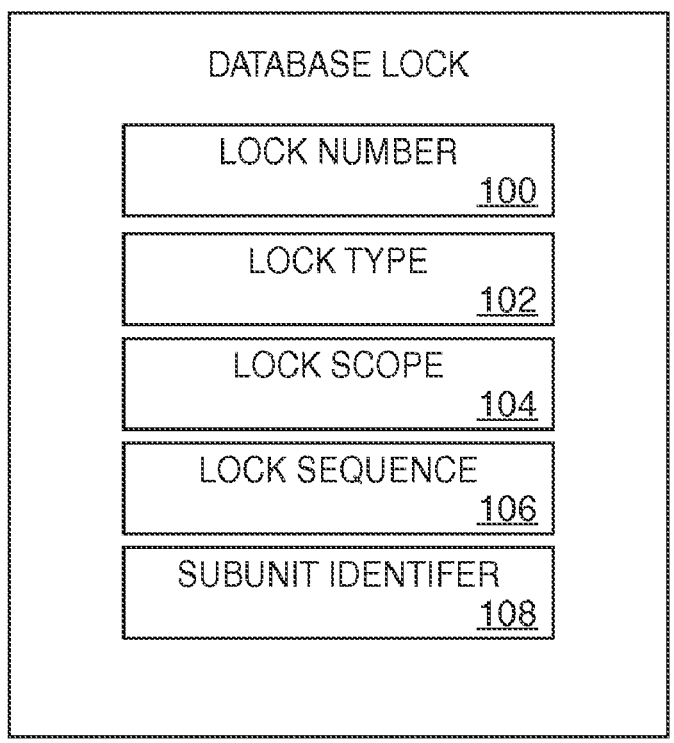
FIG. 6 is a diagram illustrating the fields of the log table in one embodiment.
FIG. 7 is a block diagram of the components of database locks.

The scheduler module 54 is used to track the execution of the respective transactions, and specifically the transaction operations upon the respective database records. The database load balancer 26 is shown in this exemplary embodiment, as being comprised of one scheduler module 54. In alternative embodiments, there may be more than one scheduler 54 that is associated with a database load balancer 26. The scheduler 54, first receives the operations associated with the transaction request 29 (FIG. 1) as well as the various lock and sequence operations assigned to that operation by the lock module 52 and the sequencer 53. The operations, lock and sequence operations that are received are then used to determine the distribution and processing requirements for the operation amongst the database servers 20 (FIG. 1). As described, the operations are distributed evenly across the database servers 20 (FIG. 1) according to the availability and processing capability of the servers 20 (FIG. 1) and the locking and database consistency requirements, unless the particular database 25 (FIG. 1) is on all of the database servers 20 (FIG. 1) or a quality of service configuration precludes a client from accessing all of the database servers. In an exemplary embodiment, the scheduler 54 in order to track the execution of the respective operations and transactions employs a scheduler table 66 (FIG. 4), a database server load table 80 (FIG. 5), and a log table 81 (FIG. 6). In alternative embodiments, the scheduler module may be implemented as a separate parallel process that tracks the execution of the transaction requests. In the alternative embodiments where multiple database load balancers 26 are managing a database 25 (FIG. 1), there will be multiple instances of the scheduler module 54 and multiple copies of the logs required to maintain the database consistency on each set of database servers 20 (FIG. 1) managed by each of the database load balancer 26.

The database load balancer 26, in an exemplary embodiment has associated with it a scripting module 55 and a rewriter module 56.

The scripting module 55 is used to determine the unit and subunit record locking requirements when an incoming operation is an indirect operation whose capabilities are both dynamic and opaque to the database load balancer (e.g. a stored procedure that performs internal operations based on the arguments that are provided to it). Indirect operations in one embodiment are stored procedures that access a data record and perform operations other than direct updates (which are directly discernable from the nature of the query). The scripting module 55 uses information from the actual application provided operation along with a programmatic script to determine the appropriate units and subunits that are going to be accessed (along with the type of access), allowing for the appropriate unit and subunit level locks to be issued. For example, without this ability to determining the subunits that are being operated upon within a stored procedure, where a specific row of a table is to be updated, the entire unit would have to be locked prior to the update operation to ensure consistency (e.g. to ensure that the correct subunit in the unit is locked, one would need to lock the entire unit/all subunits). When considering that the unit may contain vast quantities of data that will be unaffected by the update operation that is being performed on one subunit, the determination of the respective subunit that is to be updated allows for only appropriate subunit level locks to be issued so that the entire unit does need to be locked during the operation. The scripting module 55 determines the appropriate subunit (e.g. row) level lock to issue by making use of a predefined script that encapsulates the locking requires associated with the procedure. The scripting module 55 therefore allows for instructions to be provided to the database load balancer 26 that permit a subunit level lock to be issued even when the subunits are not directly determinable from the query analyzer. The scripting module 55 can also be used to control other aspects of the load balancer processing, including reusing the query analyzer to process dynamic queries, the rewriter module to rewrite or modify queries, the catalog module to look up database structure information, etc.

The rewriter module 56 analyzes the contents of the client requests 28 (FIG. 1) to determine whether any non-deterministic elements are used. When the database load balancer 26 sends requests to each of the database servers 20 (FIG. 1) and the corresponding database engines 22 (FIG. 1), it is expected that the result of processing the query at each database engine 22 (FIG. 1) will have the same result (deterministic behaviour) to ensure the consistency of the database 25 (FIG. 1). If there are non-deterministic elements in the query, this would result in the database records on each database server 20 (FIG. 1) becoming inconsistent. Examples of non-deterministic elements, include, but are not limited to a function that returns the current time or a random number. Consider a query that is putting a record into an audit table where one of the columns is being filled with the results of the "current time" function (e.g. when the audit record was generated) as an example. If this query was sent to the database servers 20 (FIG. 1) without modification, each database engine 22 (FIG. 1) would run the query at a slightly different time, resulting in an audit table on each of the database servers that is not identical to the others. Therefore, where a non-deterministic element is determined to exist by the re-writer module 56, the re-writer module 56 where possible will replace the non-deterministic element of the query with a deterministic value. In the example above, the function call for the "current time" in the query would be replaced with the actual time value (from the clock associated with database load balancer), ensuring the audit record being written to the database is the same on all of the database servers 20 (FIG. 1). The rewriting module 56 provides an efficient mechanism by which the query or transaction request may be modified to allow for more efficient processing in a distributed database processing environment.

The catalog module 57 is used to determine relationship information for the data that is stored in the databases 26 as is required for the operation of the database load balancer 26. In one embodiment, the catalogue module 57 stores the identification of relationships between database constructs such as stored procedures and triggers and database units and their respective units and subunits. It also stores the programmatic scripts used by the scripting module to more accurately determine the locking requirements for a request using the associated database construct as described above. The catalog module also contains information regarding the relationship between data units and their respective data subunits including the keys that are used to identify subunits within the unit when exact predicates are used. These keys are described with reference to database units or tables and are illustrated for purposes of example with reference to FIG. 3. The keys or subunit identifiers provide information used to reference rows of a data store such as unique row or record identifiers.

In one embodiment, the database load balancer may have resident upon it a load balancer cache 58. In specifically configured conditions, the load balancer cache 58 would store information of the identifiers or keys that are used to access the database subunits within the data units. The contents of the cache would be kept up to date using standard caching methodologies. Where access to the database subunits is not determinable upon the database keys as illustrated below, it is possible through use of the database cache a determination of the respective subunits associated with the transaction requests may be determined. To illustrate the use of the database load balancer cache 58 in an exemplary embodiment reference is made to the following example. As an example, the system 10 stores a database table that is used to track customers, where the key used to reference each entry in the customer table is the customer identifier, and an invoice table that uses an invoice number to identify each entry and also stores with each invoice the customer identifier with whom it is associated. When a request is made to attempt to access all of the invoices belonging to a specific customer, without having previous knowledge of the customer invoice identifiers, the entire invoice table would need to be locked. The cache 58 allows for the invoice identifiers for each customer to be stored locally and used by the analyzer module to properly construct only the row level or subunit level locks that need to be issued. The database load balancer cache in one embodiment is used as a local data, where a transaction request may be immediately processed without the need to send requests to the database services. As the database load balancer behaves as a gateway through which all database requests are directed, the cache is maintained through any updates to the customer invoice table that are detected by the database load balancer, allowing the cache to be updated. The update could be accomplished by parsing the actual query that is modifying the key data or by issuing a general request to one of the database nodes to reload the cached information.

Reference is now made to FIG. 3, where a block diagram illustrating a database record is shown for purposes of description. The database record shown in FIG. 3 for purposes of example is shown as a database unit, or table, 60. The database table is shown with multiple database subunits 62 which are database rows in this example. Further, each database row or subunit has associated with it a database key. The database key is generally used to compute or reference the specific row identifier that is associated with the subunit. For example, for a database table that is associated with information regarding customers, the key associated with the database rows could be the customer identifier that uniquely identifies the customer (e.g., a customer number). To better illustrate the locking capabilities associated with the systems and methods described herein, where a database table is being operated upon (for example a query that requires an update to information for a particular customer, where that customer's information is stored in a particular row), the entire database table does not need to be locked to ensure data consistency as upon determining which data subunits are being operated upon, the appropriate database lock may be issued only for the row or subunit of interest. The database key in one embodiment is a subunit by row identifier, however in alternative embodiments, it may be a virtual identifier that may correspond to multiple subunits. Database keys have been described herein as being used to reference subunits, however other methods may be used to reference the subunits. By allowing for processing of hierarchical data structures through the methods that have been described herein, the system 10 is able to process and accommodate complex forms of database records, including nested relationships where multiple layers of records may be nested within one another.

Reference is now made to FIG. 4, where the fields of the scheduler table 66 are shown in one exemplary embodiment. The scheduler table tracks the operations, the specific sequence numbers and locks and responses associated with the operations. The scheduler table 66 in one exemplary embodiment, comprises an operations field 72, a sequence number list field 74, a locks requested list field 76, a response field 78, and the subunit identifier field 79. The scheduling table 60 is illustrated with respect to one embodiment. A record is created and entered into the scheduler table 60 for each operation received by the load balancer as part of the transaction request 29 sent from the application server 18. The operations field 72, records the operations that are part of the transaction. The sequence number list field 74, specifies the set of sequence numbers that have been assigned to the respective operation by the sequencer 53. For one operation, a list of sequence numbers and locks may be assigned. The locks requested list field 76, specifies the database locks that are associated with this particular transaction, and more specifically that are associated with the operations that will be performed at the subunit level, as the subunit level locks have been determined. As mentioned above, more than one lock may be associated with a particular operation as the operation may utilize multiple database records. The response field 78 records the results of the execution of the respective operation at the one or more databases. In an exemplary embodiment, the contents of the response field in one embodiment are the success/fail response codes from each of the distributed database engines 22 based on the attempt to perform the requested operation at the respective database storage 24. The response field 78 may also include other details used by the scheduler to analyze the database responses and verify the consistency of the responses. Such other details contained in the response field may include, but are not limited to, the record update counts, the warnings or other status information, or parameter return information.

The subunit identifier field 79 identifies the respective subunits within a data unit that the respective operations will actually be processed on after locks for the subunits have been issued. In the exemplary embodiment, the subunit identifier field stores the subunit identification information through the use of a numerical value that has a unique value for each subunit. As an example, in the customer example above, this numerical identifier would be the customer number. Where the system 10 stores data records that have more complicated key identification value, a hashing function may be employed that would reduce the values of the complex key identifiers into a numerical subunit identifier. While it is not necessary for the algorithm that this hashing function give a guaranteed unique value for combination of key values it is imperative that it produce the same subunit identifier for the same set of input key values. In one embodiment, the subunit identifier is only generated where a subunit will be required to be accessed, and where a subunit is not accessed, no identifier is generated.

The subunit identifier field 79 for each operation will list the unique identifiers associated with each subunit/row associated with the unit/table that will be accessed for the operation that is being performed as described in the corresponding sequence number field 74 and locks requested field 76.

While some of the specific fields in the operations table 60 may be discarded once they are sent to the respective database servers 20, an operation record will persist until the associated operation is considered to be complete and committed or rolled back. Operations that involve the use of a write operation are sent to all the respective database servers 20 by the database load balancer 26. Therefore, transaction operations involving a write request, are recorded in the table 60, and are not considered complete until all the write operations have executed upon all the respective database servers 20, and more specifically upon the database storages 24, and a response is received from each. In an exemplary embodiment, the database 25 may operate in two general modes, an autocommit mode, and a non-autocommit mode. In the autocommit mode, the operations that are executed upon the respective database storages 24 are final and may not be reversed. In non-autocommit mode, the operations that are sent to the respective database storages 24 for execution, may be finalized (through a subsequent commit operation) or rolled back such that it is as if they did not occur (through a roll back operation). In autocommit mode, the transaction request 29 can only contain a single operation, while in non-autocommit mode, the transaction request 29 can contain multiple operations. When the database 25 is in autocommit mode, the record associated with the write operation is deleted upon completion (processed on all database servers 20) as it is automatically finalized. When the database 25 is not in autocommit mode, the operation record will persist in the table (even once completed on all database servers 20) until the transaction request 29 is completed. Once a transaction commit or rollback occurs, the transaction request 29 is considered to be complete and all of the associated operation records will be removed from the table. The database load balancer 26 only sends read operations to one of the database servers 20 (based on load factors associated with the respective servers as described below, the distribution of the database records on the servers and the quality of service agreements). When the database 25 is in autocommit mode, the read record would also be deleted upon completion. In a non-autocommit mode, the read records would be retained until a transaction commit or rollback occurs as the associated locks are still held by the transaction. In addition, in non-autocommit mode, the scheduler would also send a 'virtual-read' to the other database engines not performing the read. In the exemplary embodiment, this 'virtual-read' contains all of the lock and sequence information associated with the read operation but not the actual query. This permits the database servers 20 which are not performing the read to establish the read locks and maintain the associated scheduling information to remain consistent with the database servers 20 actually performing the read. Where the database 25 is operating in non-autocommit mode, when a commit or rollback operation is received by the database load balancer 26 all of the operation records held as part of the transaction would then be deleted.

When a read operation is made as part of a transaction request 29, the database load balancer 26 sends the read operation to only one database server 20. There are numerous mechanisms by which the database load balancer 26 can determine which of the database servers 20 should receive the request. In one exemplary embodiment, the load balancer 26 can use the scheduler table 60 to determine the current status of all of the database servers 20. The load balancer 26 by analyzing the scheduler table 66 may select the database server that is most "up-to-date" with respect to the database records of interest (for example which server has the least number of outstanding requests for the database records). In another exemplary embodiment, the database server 20 could be determined based on the current load of the database servers 20, as described below. In each case, the objective is to determine the database server 20 that is best suited to process the read request as soon as possible. Other algorithms may be used to determine the database server 20 best suited to process the read operation, including, but not limited to the use of a "round-robin" distribution of requests, the use of query analysis to optimize the server selection, and the use of an adaptive/learning engine to perform the selection or any combination of the above.

Reference is now made to FIG. 5, where the fields of the database server load table 80 are shown in one exemplary embodiment. In one exemplary embodiment, the database server load table 80 is comprised of a database server field 82, and a load field 84. A record will be entered and updated in the database server load table 80, when a response is received from a database server. The respective database server 20 that transmits a response based on the operation performed at the database storage 24, includes with the response, information pertaining to the load that remains to be processed at each database. The term load is used to refer to the processing ability of the respective database storage 20 which may be dependent upon any one of a number of factors, including, but not limited to the operations remaining to be performed, the processing speed of the server 20, and other measures that may be used to determine the load upon a database server 20. In an exemplary embodiment, when processing a read request, the scheduler module 54 consults the database load table 80 to determine which database server 20 the read request should be sent to. This ensures that a database server 20 with the lowest load receives the read request. In alternative embodiments of the database server load table 80, the load associated with each database server 20 may be determined based on selective updates (where load information is passed only with certain classes of requests), periodic updates (where load information is returned on every n-th response or a response at every n-th time) or asynchronously, where a separate process is used to update the database load values according to a defined schedule. In an alternative embodiment, the load field 84 stores the number of requests still pending on the database engine in question.

Reference is now made to FIG. 6, where the fields of the log table 81 are shown in an exemplary embodiment. The log table 81, in an exemplary embodiment, comprises a connection field 90, an operations field 92 and a status field 93. The connection field 90 indicates the database server 20 to which the database load balancer 26 has sent an operation to for execution. The operation field 92 specifies the operations that have been sent to the respective database server 20. The status field 93 indicates the response received from the database server 20 in response to the execution of the operation. The log table 81 is updated continuously, so provides an accurate record of all the operations that have been transmitted through the database load balancer 26. This log table 81 may exist only in memory on the database load balancer 26 but will, in most cases, also be stored on a physical storage device for persistence. In this way, should there be a restart of the processes associated with the database load balancer 26, the persistent log table stored on the physical device can be used to reconstruct the log information. There may also be multiple copies of the log table 81 to maintain availability and consistency in the event of a complete load balancer 26 failure. Also, as described earlier, where there are multiple load balancers 26 managing the same copy of the database 25, there exist multiple copies of the log table 81, where in an exemplary embodiment one log table 81 is associated with each load balancer. Where multiple load balancers 26 are employed, the respective log tables 64 are maintained in a consistent manner. This log table 64 is used whenever a database server 20 needs to be updated as it may have been offline. A database server 20 may have been offline for a variety of reasons, including but not limited to, a power failure, or a faulty network connection. When the database server 20 comes back to an online state, it is necessary for it execute all the operations that were not possible when it was offline. As a result, the log table 81 is used to transmit operations that are necessary to ensure consistency of data to database servers 20 that have come back online. By executing the operations sent from the log table 81, the database server 20 that has come back online then contains an identical data storage 24 to all the other database servers 20 and their respective database storages 24.

Figure 9:
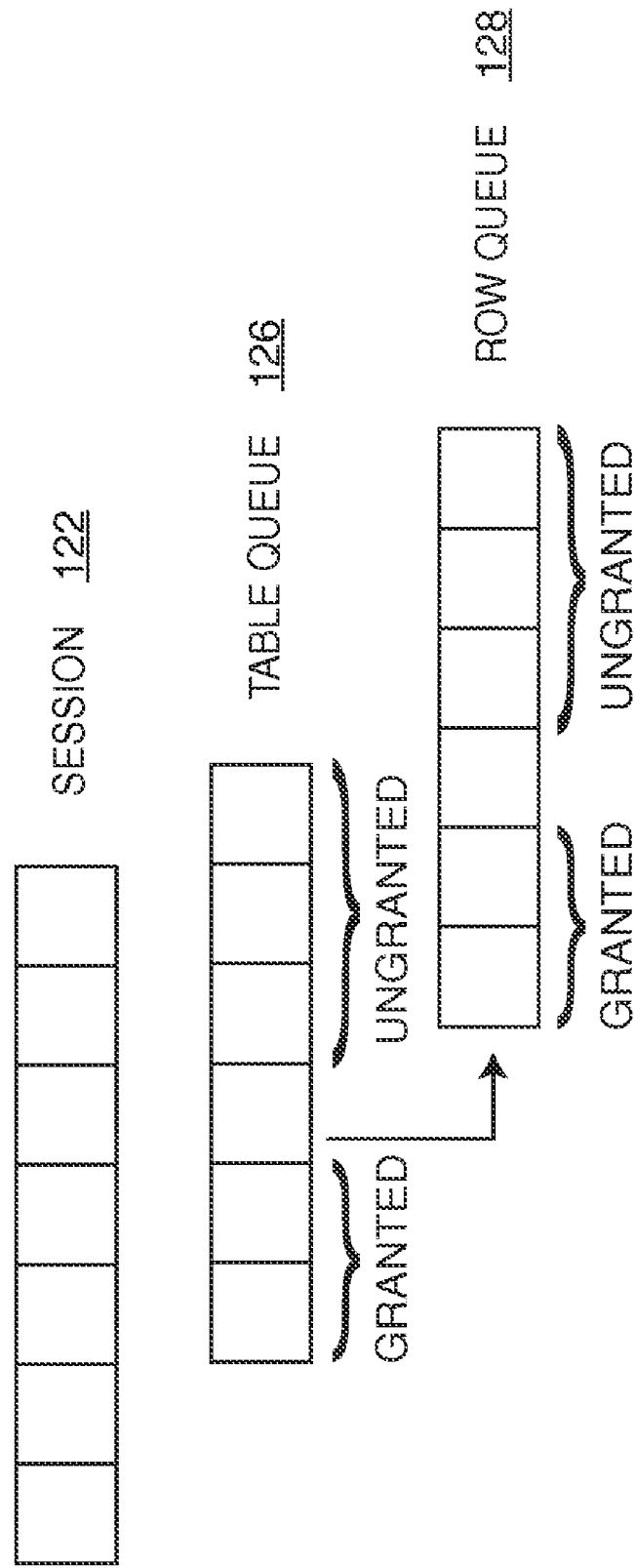
FIG. 9 is a block diagram illustrating the user queues and record queues.

The respective tables that have been discussed above, including the scheduler table 66, the database server load table 80, and the log table 81 may all be used in combination with the respective queues that are described in further detail with regards to FIG. 9 if any database storage 24 requires reconstruction. As discussed above, the database storage 24 may be reconstructed as a result of it having been unavailable for any reason, or where the administrator wishes to reconstruct a database storage 24 at any point in time of the database storage's existence. This allows, if necessary for a database storage 24 to be reconstructed to determine its state at any point in time, and also for the database storage to be reconstructed where one or more query instances need to be removed. Entries may be removed where the administrator may desire to remove an errant entry in the database (for example, the accidental deletion of a database table).

The log table as described above may be used to reconstruct a database storage 24 at any instance of time. The log table 81 may be used to remove entries in the database storage 24 that have been made in error, and then reconstruct the database storage 24 accordingly. In an exemplary embodiment, the database load balancer highlights certain operations as ones that may have potentially been made in error. Specifically, any operations that may be requested to be undone (the addition or deletion of data), or provide difficult to undo (i.e. removing a table from a database), may have the effects of the operation stored in a temporary state.

The database load balancer 26 depending on the transaction request, and the operations requested, may cause a portion of the data record on the database storage to be hidden. Where it is determined that an operation may have been requested in error, and where reversing the operations are processor intensive, data records may be hidden in response to certain operations. Where data records are hidden, they are not deleted but rather renamed in the event that if the operation is reversed the data record may be restored by assigning it the name originally associated with it. As an example, where a table is requested to be deleted, the query may be modified to rename the table when the user is not likely to the user is not likely to use is not likely to use the rewritten name. If it is then determined that such an operation is to be reversed then the original name is restored. If it is determined that the deleted table operation was not requested in error, then after an elapsed number of operations the table may be deleted.

The log table 81 as has been described here may be used to reconstruct a database storage 24 when the database storage 24 has become unavailable, or where an error has been made, and one or more operations are reversed, and the database storage 24 then reconstructed. This requires the entire set of operations to be recomputed upon the respective database storage 24 if a change is to be made. The database load balancer in an exemplary embodiment may designate one database storage 24 as a delayed storage. The delayed storage 24 may not be used to perform read queries as the delayed storage does not store the most current data, as not all of the operations have been executed upon the respective storage 24. As the execution of various operations upon the delayed storage 24 lags behind that of the other storages 24, the database load balancer 26 is able to filter an errant operation such that it does not execute upon the delayed storage 24. The remaining operates may then be executed upon the delayed storage 24, and the other database storages 24 may then replicate the delayed storage 24, instead of having to rebuild the other database storages as a result of the errant operation. An errant operation may be any operation that is then reversed.

Reference is now made to FIG. 7, where database locks are illustrated in further detail. In an exemplary embodiment, each database lock has associated with it a lock number 100, a lock type 102, a lock scope 104, a lock sequence 106, and a subunit identifier 108. The lock number 100 is used as a unique identifier that associates the lock with the particular database unit and, more specifically, with the subunit that has been identified and stored in subunit identifier field 108. The lock type signifies whether the lock is a read or write lock. The lock scope 104 specifies how long the lock is to remain in place for. The lock scope 104 may either be of a transactional scope or an operational scope. In the transactional scope a lock is placed upon a database record that is only removed when all the operations that comprise the transaction have executed. In the operational scope, the lock is in place only as long as is necessary for a specific operation to be completed. The lock sequence 106 is the sequence number associated with the lock as part of the transaction. While a subunit level lock is described above with reference to FIG. 7, it will be appreciated that a unit level lock can similarly be implemented, with appropriate modifications.

Figure 8:
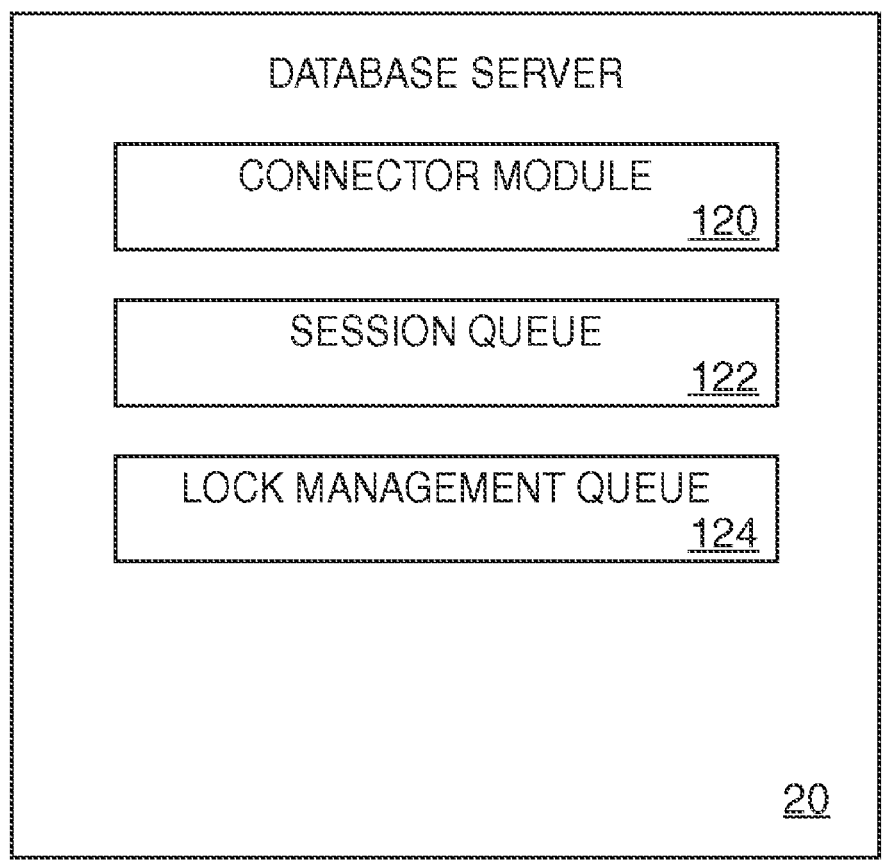
FIG. 8 is a block diagram of the components of a database server.

Reference is now made to FIG. 8, where the components of an exemplary embodiment of the database server 20 are shown. The components contained in this exemplary embodiment are found on all database servers 20 that are part of the database 25. Each database server 20 has resident upon it, or accessible to it, a connector module 120, a session queue 122, and lock management queue 124. A lock management queue 124 exists for each database unit and subunit that is resident upon the database storage 24. A session queue 122 exists for each unique session established between the application server 18 and the database server 20. While any particular transaction request 29 will be completely processed through a single session, there may be multiple sessions attached to the database server 20. For example, each session may correspond to a different user login on the client 12. The connector module 120 receives the operation request sent from the database load balancer 26 along with the database locks and sequence numbers that are associated with the operation. The connector module 120 proceeds to place all of the operation requests and the associated locks in the corresponding session queue 122, as well each of the appropriate record queues in accordance with the methods described below. In an exemplary embodiment, the connector module 120, session queue 122 and record queues 124 are stored upon the respective database engines 20. In alternative embodiments, the respective connector modules 120 and respective queues associated with each database server 20, may be stored upon the database load balancer 26.

Upon the completion of a specific operation at the respective database server 20, the database server 20 returns the result of the operations. The results may include, but are not limited to, a success/failure status code, statistical information (e.g. the number of rows updated), and complex result information (in the instance of a read operation). Upon the response being returned to the database load balancer 26, the next operation that is to be processed in the session queue 122 depending on the sequence number assigned, may be executed. Upon receipt of the response from the database, the database load balancer 26 needs to respond to the application server 18 that had requested the operation. In one exemplary embodiment, if one response to a write operation has been returned, as the same write operations are sent to all of the databases, the database load balancer 26 proceeds to respond to the application server upon receipt of this first response. In alternative embodiments, the database load balancer 26 may return a response to a write operation at different times. For example, the load balancer 26 may wait for all writes to complete to ensure a consistent result (through a voting model), wait for the first successful write to return (assuming the errors are inconsistent cases), or use a more complex algorithm to ascertain the expected write status based on the responses from the database servers 20 and respond once the result is definitively known. For a read operation, the request was only sent to one database server 20, so the database load balancer 26 can immediately respond to the application server 18. In an exemplary embodiment, the database load balancer 26 can also capture a read error that is not due to an invalid query (e.g. a network failure) and resend the read request to another database server 20.

Reference is now made to FIG. 9, where a figure illustrating the session queue 122 and the set of lock management queues 124 is shown. The lock management queues 124 include unit/table queues 126 that each have child subunit/row queues 128. In FIG. 9, the session queue 122 is shown along with a single unit/table queue 126 and a single subunit/row queue 126. For the purposes of this description, only a single session queue 122 has been shown, however it will be understood that the session queues 122 will exist for each of the number of sessions. Likewise, there will be a number of unit/table queues and a number of subunit/row queues according to the requests being made and the database model. Each row queue 128 is explicitly associated to the table queue 126 according to the subunit-unit relationship and there can be multiple row queues associated to a table queue. In one embodiment, a row queue is generated for each row identifier that has been generated. All of these queues ensure that the transaction requests are ordered appropriately. The use of the queues described herein ensures that the operations are not performed out of order when they are analyzed across the respective databases. In an exemplary embodiment, each record queue will track and store the list of granted read requests, the granted write request and the ungranted requests. At any one time there may be any number of granted read requests, however there may be only one granted write request and there may not be any granted read requests when there is a granted write request. In the event that a session that has a granted read request escalated to a write request, the original read request is removed as part of the write request granting. The ungranted requests are stored according to their assigned sequence number and, for requests with identical sequence numbers, in order of arrival. When a transaction request is first received the respective locks associated with the transaction requests, be it a unit or subunit lock, are placed into the unit queues associated with the each of the locks of the request into the ungranted requests list in the order described above. As operations that are in the queue are processed and released, other locks/operations placed in the table or unit queue advance until they are at the front of the queue, at which time a check is performed. If a unit lock is being dealt with, the unit or table in this example is locked (the lock has been granted and moves to the granted list). If a subunit is being dealt with, the subunit lock is promoted to the row queue according to the associated row/subunit identifier and added in order to the ungranted list for that subunit. The locks associated with respective transaction requests are described in further detail with regards to FIGS. 10 and 11, however, the locks are granted once the transaction requests have reached the head of the queue so as not to ensure that unnecessary locks have not been issued. For both the unit and subunit queues, the head of the queue is defined to be the first record in the queue (in other words, the first with the lowest sequence number). As multiple read locks can be granted, the notion of the head of the queue can be extended to include the set of ungranted read locks if they all have same lowest sequence value. As a result, it is possible for multiple records to simultaneously be at the head of the queue and granted, so long as they have been assigned the same sequence number by the sequencer module 53 and are all read locks.

The method by which the sequence number and scope are associated with locks is now described. In an exemplary embodiment, the sequence numbers and scope depend partly on the transaction isolation level and the data unit that is being operated on. Transaction isolation levels allow for control over the degree of access to the database records. The transaction isolation levels, in an exemplary embodiment, are described with respect to ANSI SQL. However, it should be understood by one skilled in the art, that transaction isolation levels vary depending on the particular query languages being employed in the system 10. The transaction isolation levels are a property of the transaction request 29. The isolation levels are specified ultimately by the requesting application/server, as the requesting application server determine what type of locking levels are to be in place. For example, in banking operations, the most stringent isolation level will generally be requested, whereas for other applications a less stringent isolation level is desired. When higher isolation levels are used, the performance of the system is reduced, due to the increased contention for the database records.

Figure 10:
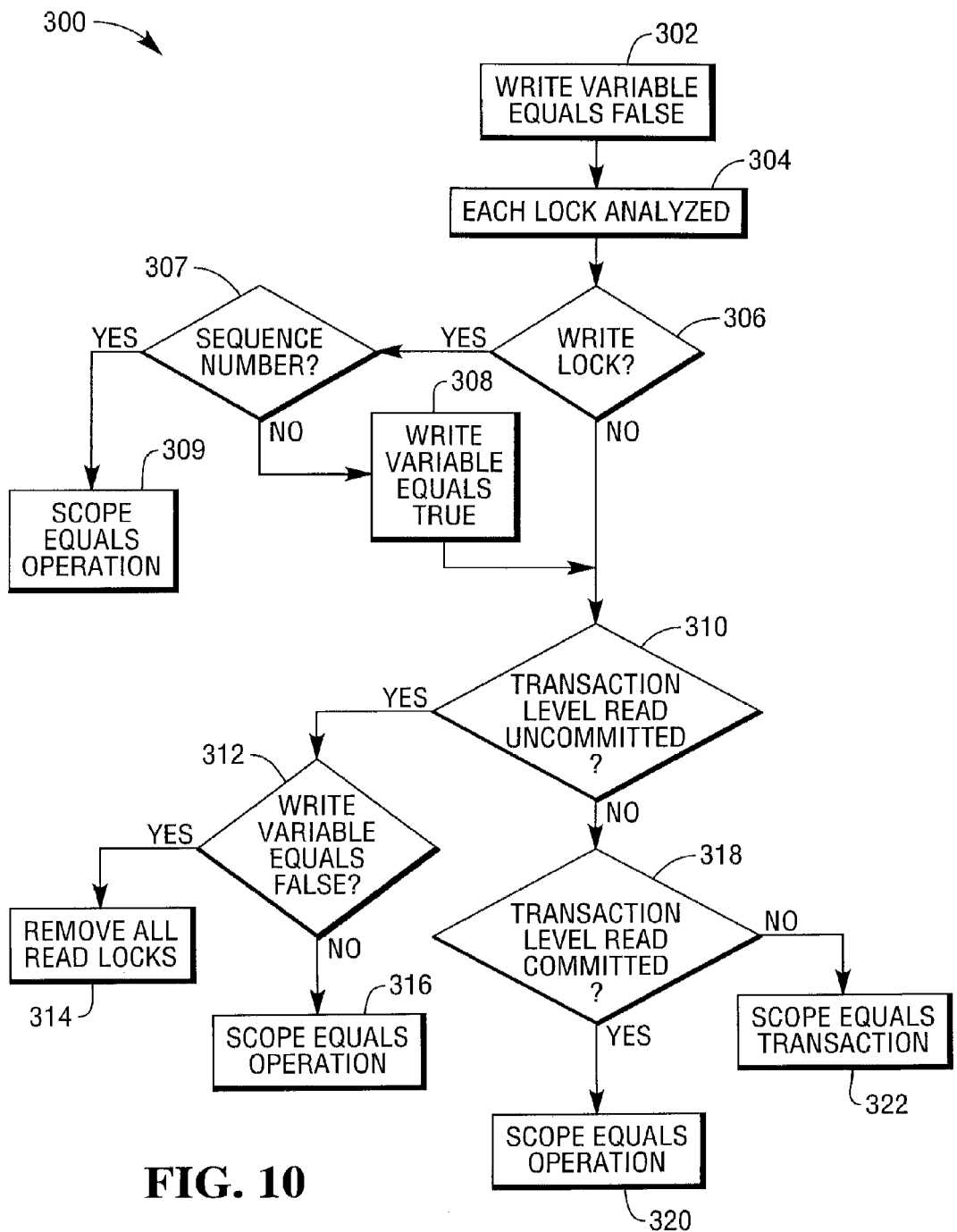
FIG. 10 is a flowchart illustrating the steps of a lock scope assignment method.

Reference is now made to FIG. 10, where the steps of the lock scope definition method 300 are shown. The lock scope definition method 300 defines the scope of all the read locks and all the write locks for a particular operation within a transaction request 29. The read locks as mentioned above, in an exemplary embodiment, may either have a transaction scope or an operation scope. At the start of method 300, all the write locks that are part of the operation are assigned a transaction level scope, as it is necessary for all the write locks to be in place for the duration of the execution of all the operations that make up the transaction. Method 300 is undertaken for each operation that is to be carried out upon one or more of the respective databases storages 24, and as received by the database load balancer 26. Method 300 begins at step 302, where a variable is assigned to keep track of whether in an operation any write locks are required. The variable is initially assigned the value false. Method 300 then proceeds to step 304, where each lock that is part of the operation is analyzed. Method 300 then proceeds to step 306, where a check is performed to determine whether each lock that is part of the operation is a write lock. If a write lock is found, method 300 proceeds to step 307, where a check is performed to determine if the operation has associated with it a sequence number. Where the operation does not have associated with it a sequence number, this indicates that it is a subunit level or row level operation. If the operation does not have associated with it a sequence number, method 300 proceeds to step 308, where the variable is assigned the value true. Upon the variable being assigned the value true at step 308, or where no locks remain to be analyzed, method 300 proceeds to step 310. If at step 307 it is determined that the operation has associated with it a sequence, method 300 proceeds to step 309, where the scope of the lock is determined to be the scope of the operation. At step 310, a check is performed to determine what the transaction isolation level is. If the transaction isolation level is read uncommitted, method 300 proceeds to step 312. At step 312, a check is performed to determine whether the variable that keeps track of whether any write operations exist in the operation is false. If at step 312, it is determined that the variable is set to false, method 300 proceeds to step 314. At step 314, all the read locks are removed from the operation. In order to remove all the read locks, method 300 has determined that the transaction isolation level is read uncommitted and that that the operation does not modify any database records. If the transaction isolation level is read uncommitted, and the step 312 returns the value true, method 300 proceeds to step 316. At step 316, all read locks that are part of the operation are assigned an operation scope.

If at step 310, the isolation level is not read uncommitted, method 300 proceeds to step 318, where a check is performed to determine whether the transaction isolation level is read committed. If at step 318, it is determined that the read lock scope is read committed, method 300 proceeds to step 320. At step 320, the read locks that are part of the operation are assigned the operation scope. If at step 318, it is determined that the transaction isolation level is not read committed, method 300 proceeds to step 322. Method 300 proceeds to step 322 where the transaction isolation level is either set to repeatable read or serializable. At step 322, the transaction scope for all the read locks are assigned as transaction scope.

At the conclusion of method 300, all the read locks that are part of an operation have a scope assigned, and it is then necessary to determine the sequence numbers associated with the specific locks that make up the operation.

There are also special cases where an explicit scope and type can be established for the unit/subunit locks for a particular database entity, either through a configuration setting in the catalog module 57 or due to the particular characteristics of the database entity being accessed. The support for special configuration control of the type and scope behavior allows an administrator to adjust the behavior of the database load balancer to tune the system performance or avoid errors such as deadlock. An embodiment of a special database entity that does not follow the method 300 would be a database sequence or identity value, which is treated as a write operation but because it is not a transactionally reversible value (e.g. cannot be rolled back) the associated scope for the operation would actually be 'request'.

Figure 11:
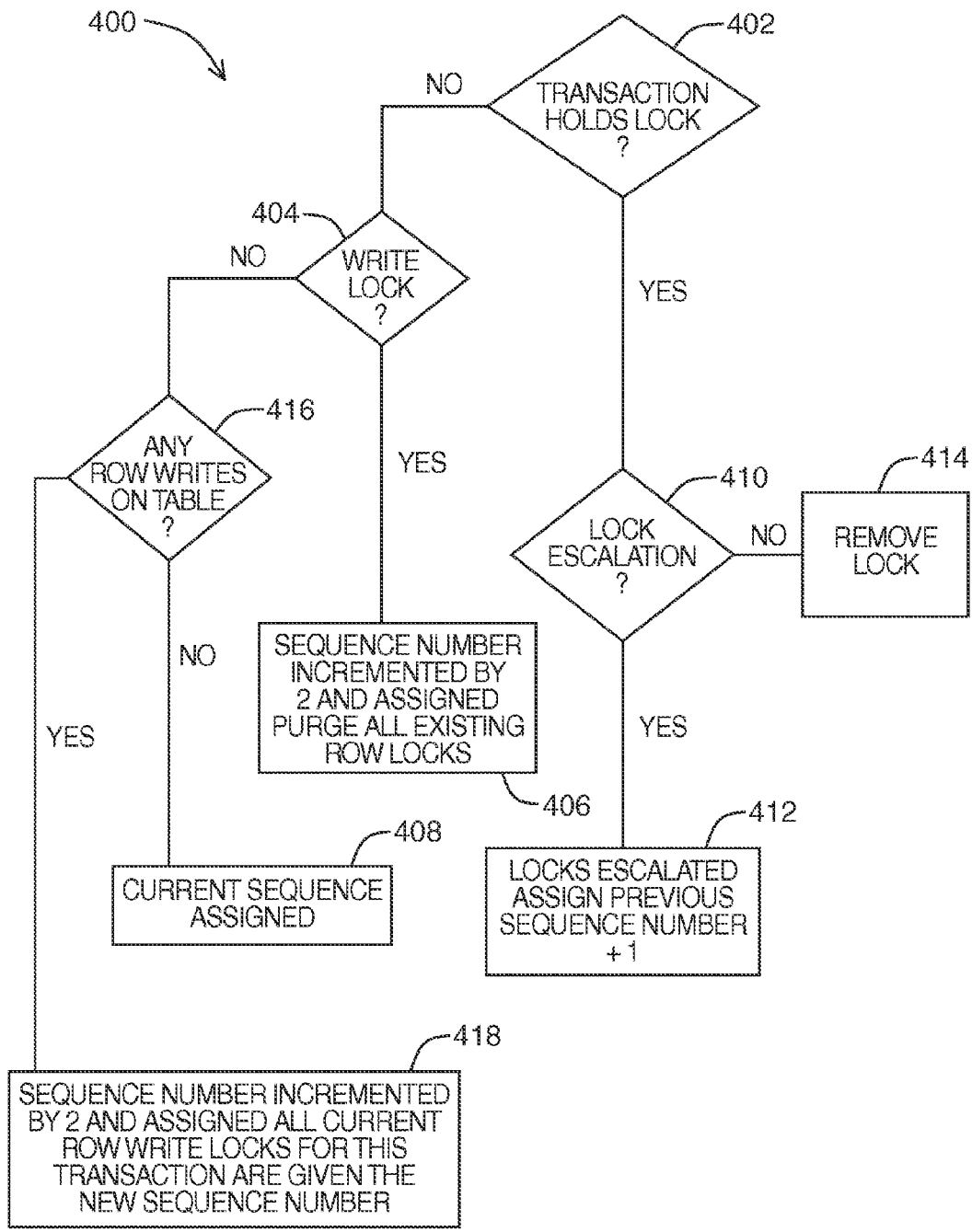
FIG. 11 is a flowchart illustrating the steps of a unit sequence number assignment method.

Reference is now made to FIG. 11, where the steps of a sequence number assignment method 400 for a unit/table level lock are shown. The steps of the sequence number assignment method 400 are carried out for each unit/table lock that is part of an operation. Method 400 begins at step 402, where a check is performed to determine whether the current transaction already holds a lock for the database unit in question. If at step 400, it is determined that the transaction does not hold this lock, method 400 proceeds to step 404. At step 404, a check is performed to determine whether the requested lock is a write lock. If the requested lock is a write lock, method 400 proceeds to step 406. At step the sequence number associated to the database unit in question is incremented by two the requested write lock is granted with the new sequence number and all existing row locks for this transaction are purged. If at step 404, it is determined that the requested lock is a read lock, method 400 proceeds to step 416. At step 416, a check is performed to determine if any row/subunit write locks have been issued against the unit. If there have been no row/subunit write locks issued, method 400 proceeds to step 408, and the requested read lock is granted with the current sequence number of the database unit. When the sequence number associated with a new write is incremented by two from the last sequence number that was assigned for the database unit, this allows for an existing read lock already assigned to this database unit (from another transaction) to be escalated into a write lock as described below without having a conflict in the system. In the exemplary embodiment, as only read and write locks have been described; the increment of two corresponds to the use of only two types of locks. In alternative embodiments, where additional lock levels are supported, other sequence number increment schemes may be employed.

If at step 416, it is determined that there have been existing row/subunit write locks issued, method 400 proceeds to step 418 where the sequence number for the unit in question is incremented by two and the new value is assigned to the lock. In addition, all existing row write locks for this transaction on subunits of this unit are reissued as part of the current operation with the new sequence number. Again, in this case the increment of two allows for an escalation of a table read lock to a table write lock as described above and the increment could use different values where different lock levels are supported.

If at step 402, it is determined that the transaction already holds a lock for the database unit in question, method 400 proceeds to step 410. At step 410, a check is performed to determine where a lock escalation is required. At step 410, the lock escalation check is performed by determining first whether the requested lock is a write lock, and then determining whether the current transaction has a read lock for the same database unit as the requested write lock. If step 410 determines that the current transaction holds a read lock for the same database unit as the requested write lock that is being analyzed, then method 400 proceeds to step 412. At step 412, the read lock is essentially changed to be a write lock through a process that is described here as escalation.

If at step 412, it has been determined that a lock escalation is to take place for a requested write lock, consideration must be made for a potential deadlock in the system. If no other transaction currently has a write lock for the database unit in question, the sequence number for that database unit is incremented by one (read to write) and the write lock is granted with the new sequence number. If another transaction has a write lock with a sequence number two greater than the sequence number of the read lock currently held by the transaction, the other write lock is a non-conflicting request (e.g. not a concurrent escalation) that allows for the escalation. In this case, the sequence number of the database unit is left unchanged (it has already incremented by two) but the requested write lock is granted with a sequence number of the existing read lock plus one, and the existing read lock is dropped. Finally, if another transaction already has a write lock with sequence number one greater than the sequence number of the read lock currently held by the transaction, there is a conflict. This would arise where two separate transactions acquired a read lock for a database unit, one escalated (sequence number incremented by one) and then the other attempted to escalate as well (lock conflict). In this situation, a deadlock is considered to have occurred and the transaction that is requesting the write lock is aborted, the operations within that transaction are rolled back and all of the locks associated with that transaction are dropped. This reflects an example of a possible deadlock that must be taken into consideration; with the inclusion of unit and subunit level locking there are many other deadlock cases that could also occur that must be handled as above, some of which are described below. If it is determined at step 410, that no escalation is required, method 400 proceeds to step 414. At step 414 the requested lock that is currently being processed by method 400 are removed, as the transaction already holds the same locks. Upon the conclusion of method 400 which is undertaken for all unit locks that are part of a transaction, the system proceeds to method 500 to assign the row locking sequences for the transaction.

Figure 12:
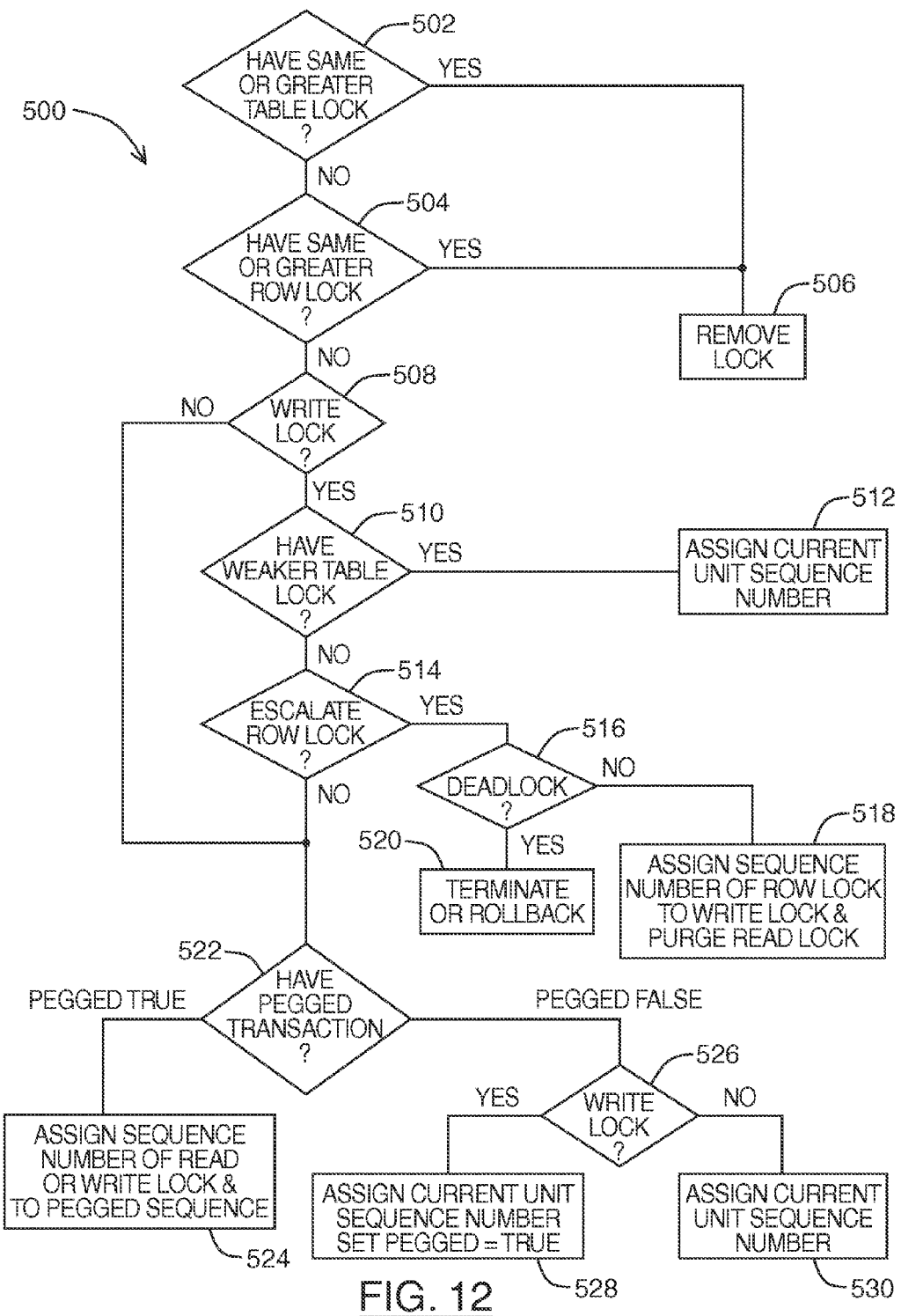
FIG. 12 is a flowchart illustrating the steps of a subunit sequence number assignment method.

Reference is now made to FIG. 12, where the steps of a subunit sequence number assignment method 500 for a subunit/row level lock are shown in an exemplary embodiment. Method 500 begins at step 502, where a check is performed to determine if the transaction holds the same or greater (e.g. a read is held when a write is requested) lock for the parent unit of the subunit. If the transaction already holds such a lock, method 500 proceeds to step 506 where the requested lock is discarded. Where such a lock is already held, the requested lock is not required to ensure data consistency. If, however, it is determined at step 502 that no such lock exists, method 500 proceeds to step 504 where a similar check is performed to determine if the transaction holds a same or greater lock for the same subunit being considered. Similarly, as with step 502, if the transaction already holds such a lock, method 500 proceeds to step 506 where the requested lock is discarded.

If it is determined at step 504 that there is no existing row lock that already has the required locking privileges for the requested lock, method 500 proceeds to step 508, where a check is performed to determine if the requested lock is a write lock. If it is determined that the lock is a write lock, method 500 proceeds to step 510, where a check is performed to determine whether an already existing weaker table lock exists that allows for the row lock; in this embodiment, the check determines if the transaction already has been granted a unit/table read lock. If the transaction already has a weaker table lock granted, method 500 proceeds to step 512, where the lock is assigned the current unit sequence number.

If it was determined in step 510 that the transaction does not already have a weaker table lock, method 500 proceeds to step 514 where a check is performed to determine if a row/ subunit lock escalation can occur. As for method 400 above, a row lock escalation is one where the transaction already holds a read lock for the given subunit/row so that the write lock can proceed. If the transaction already has a row-level read lock for the same row, an escalation could occur and method 500 proceeds to step 516.

Before a row escalation can be allowed to proceed, there are explicit conditions that can lead to a deadlock situation that are tested in step 516. As with the lock escalation scenario above, there can be multiple read locks for multiple transactions open for a given subunit. The first of these reading transactions that attempts to escalate its read lock into a write lock will be permitted. However, any subunit level escalation attempt by the other transactions that were in that read group would lead to a deadlock. Another deadlock scenario to consider is one where another transaction has advanced the unit sequence number according to steps 406, 412 or 418 of FIG. 11 above. In this situation, the current transaction must have already successfully obtained a 'pegged' row write sequence as described below for the same sequence number as the existing row lock that is being escalated, otherwise a deadlock would occur. As described above, a deadlock that is detected in method 500 ends at step 520, where the current transaction that caused the deadlock is terminated/rolled back and all associated locks are released. If it is determined in step 516 that no deadlock has occurred and the escalation is permitted, method 500 proceeds to step 518 where the lock is assigned the sequence number of the escalated read row lock and the read row lock is discarded.

If it is determined in step 508 that this is not a write lock or it is determined in step 514 that this is not a write escalation situation, method 500 proceeds to step 522, where a check is performed as to whether the current transaction has a 'pegged' sequence number, which is assigned below. If it is determined in step 522 that the current transaction has a pegged sequence number, method 500 proceeds to step 524 and the lock (whether it is read or write) is assigned the associated pegged sequence number.

If it is determined in step 522 that the current transaction does not have a pegged transaction number, method 500 proceeds to step 526. At step 526, a check is performed as to whether the lock is a read or write lock, as in step 508. If it is determined that the requested lock is a write lock, method 500 proceeds to step 528, where the lock is assigned the current unit sequence number and the current transaction is considered to be pegged at that sequence number. The transaction remains pegged until the transaction commits or rolls back, at which time the associated write locks will be cleared. If in step 526 it is determined that the requested lock is a read lock, method 500 proceeds to step 530 where the lock is assigned the current unit sequence number.

The above methods 400 and 500 are a particular exemplary embodiment of the use of sequence numbers to ensure ordering of database operations in the database servers 20. In the above embodiment, the sequence numbers are modified at the unit level to ensure ordering but only tracked at the subunit level, relying on consistent delivery ordering to maintain correctness in the order of the database operations. However, it should be apparent by one skilled in the art, that the sequence numbers are not actually required at either level so long as the underlying algorithms are captured in the construction and ordering of the queues at the database servers 20, or that sub-sequence numbers could be used to ensure ordering of the subunit queues in environments where delivery order is not guaranteed.

Upon the conclusion of methods 400 and 500 which is undertaken for all locks that are part of a transaction, the transactions which are comprised of the operations, and the respective locks are sent to the respective database servers as has been described above.

The present invention has been described with regard to preferred embodiments. However, it will be obvious to persons skilled in the art that a number of variants and modifications can be made without departing from the scope of the invention as described herein.

We claim:

1. A method for processing a transaction request at a database load balancer, the method comprising:
   (a) receiving the transaction request, where the transaction request is comprised of one or more operations to be performed upon a database;
   (b) analyzing the transaction request to determine the one or more operations and to determine one or more database units associated with the operations;
   (c) analyzing the transaction requests and the one or more database units to determine one or more database subunits associated with the database units that the transaction request will perform one or more operations upon;
   (d) associating one or more database locks with each of the one or more operations;
   (e) determining one or more sequence numbers for one or more of the database locks associated with each of the one or more operations; and
   (f) transmitting the one or more operations with the one or more unique identifiers for each of the database subunits, the database locks and the sequence numbers to one or more database servers accessible to the database load balancer.

2. The method of claim 1, wherein the one or more operations are selected from the group consisting of: modifying option settings, read operations, select operations, write operations, commit operations, roll back operations, execute operations, and prepare operations.

3. The method of claim 1, wherein each of the one or more locks has associated with it a lock number, lock type, lock scope and lock sequence.

4. The method of claim 3 further comprising the step of determining a transaction isolation level associated with the transaction request.

5. The method of claim 4 wherein each lock scope is based on the transaction isolation level.

6. The method of claim 5, wherein each lock scope is based on the database subunit.

7. The method of claim 3 wherein the lock scope is further based on the lock type.

8. A method of processing a transaction request at a database load balancer, the method comprising:
   (a) receiving the transaction request, where the transaction is comprised of one or more operations to be performed upon a database;
   (b) analyzing the transaction request to determine the one or more scripts to be executed through a scripting module;
   (c) determining through the scripting module and associated scripts, the one or more operations, the one or more database units associated with the database record, the one or more database subunits associated with each database unit and the one or more locks with the one or more operations;
   (d) determining one or more sequence numbers for one or more of the database locks associated with each of the one or more operations; and
   (e) transmitting the one or more operations with the one or more unique identifiers for each of the database subunits, the associated database locks and the sequence numbers to one or more database servers accessible to the database load balancer.

9. The method of claim 8, wherein the one or more operations are selected from the group consisting of: modifying option settings, read operations, select operations, write operations, commit operations, roll back operations, execute operations, and prepare operations.

10. The method of claim 8, wherein each of the one or more locks has associated with it, a lock number, lock type, lock scope and lock sequence.

11. The method of claim 10 further comprising the step of determining a transaction isolation level associated with the transaction request.

12. The method of claim 11 wherein each lock scope is based on the transaction isolation level.

13. The method of claim 12, wherein each lock scope is based on the database subunit.

14. The method of claim 12 wherein the lock scope is further based on the lock type.

15. A system for processing a transaction request at a database load balancer, said system comprising: (a) a memory for storing the plurality of images; and (b) a processor coupled to the memory and for:
 (i) receiving the transaction request, where the transaction request is comprised of one or more operations to be performed upon a database;
 (ii) analyzing the transaction request to determine the one or more operations and to determine one or more database units associated with the operations;
 (iii) analyzing the transaction requests and the one or more database units to determine one or more database subunits associated with the database units that the transaction request will perform one or more operations upon;
 (iv) associating one or more database locks with each of the one or more operations;
 (v) determining one or more sequence numbers for one or more of the database locks associated with each of the one or more operations; and
 (vi) transmitting the one or more operations with the one or more unique identifiers for each of the database subunits, the database locks and the sequence numbers to one or more database servers accessible to the database load balancer.

16. A system for processing a transaction request at a database load balancer, said system comprising: (a) a memory for storing the plurality of images; and (b) a processor coupled to the memory and for:
 (i) receiving the transaction request, where the transaction is comprised of one or more operations to be performed upon a database;
 (ii) analyzing the transaction request to determine the one or more scripts to be executed through a scripting module;
 (iii) determining through the scripting module and associated scripts, the one or more operations, the one or more database units associated with the database record, the one or more database subunits associated with each database unit and the one or more locks with the one or more operations;
 (iv) determining one or more sequence numbers for one or more of the database locks associated with each of the one or more operations; and
 (v) transmitting the one or more operations with the one or more unique identifiers for each of the database subunits, the associated database locks and the sequence numbers to one or more database servers accessible to the database load balancer.

\* \* \* \* \*